United States Patent
Yu et al.

(10) Patent No.: US 7,516,260 B2
(45) Date of Patent: Apr. 7, 2009

(54) METHOD OF COMMUNICATING WITH EMBEDDED CONTROLLER

(75) Inventors: Liang-Kuan Yu, Taoyuan County (TW); Chao-Hsiang Huang, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 512 days.

(21) Appl. No.: 11/160,234

(22) Filed: Jun. 15, 2005

(65) Prior Publication Data

US 2007/0011471 A1    Jan. 11, 2007

(51) Int. Cl.
*G06F 13/24* (2006.01)
*G06F 1/00* (2006.01)

(52) U.S. Cl. ............... 710/260; 710/8; 710/104; 713/324; 713/300

(58) Field of Classification Search ............ None
See application file for complete search history.

(56) References Cited

U.S. PATENT DOCUMENTS

| | | | | |
|---|---|---|---|---|
| 4,805,137 A | | 2/1989 | Grant et al. ............... 710/107 |
| 5,937,200 A | * | 8/1999 | Frid et al. ............... 710/264 |
| 6,105,142 A | * | 8/2000 | Goff et al. ............... 713/324 |
| 6,131,131 A | * | 10/2000 | Bassman et al. ............... 710/15 |
| 6,219,742 B1 | * | 4/2001 | Stanley ............... 710/260 |
| 6,446,153 B2 | * | 9/2002 | Cooper et al. ............... 710/260 |
| 6,473,819 B1 | * | 10/2002 | Jackson et al. ............... 710/200 |
| 2005/0057519 A1 | * | 3/2005 | Coe et al. ............... 345/168 |

OTHER PUBLICATIONS

Advanced Configuration and Power Interface Specification, Revision 2.0c, Aug. 25, 2003—Sections 13.1-13.5.*
"Modern System Power"—by Andrew Grover, Intel's Mobile Products Group; Oct. 3, 2003: 7 pages.*
"Advanced Configuration and Power Interface Specification", Revision 3.0; Sep. 2, 2004: 618 pages.*

* cited by examiner

*Primary Examiner*—Paul R Myers
*Assistant Examiner*—Brian T Misiura
(74) *Attorney, Agent, or Firm*—Jianq Chyun IP Office

(57) ABSTRACT

A method of communicating with an embedded controller is disclosed. The method is adapted for an Advanced Configuration and Power Interface specification (ACPI). According to the method, a busy flag is set in the status register of the embedded controller. While the Operating System Power Management handler (OSPM) accesses the embedded controller, the busy flag is set with a busy state value. When the OSPM finishes accessing the embedded controller, the busy flag is set with a non-busy state value.

7 Claims, 5 Drawing Sheets

| Bit7 | Bit6 | Bit5 | Bit4 | Bit3 | Bit2 | Bit1 | Bit0 |
|------|---------|---------|-------|------|------|------|------|
| IGN  | SMI_EVT | SCI_EVT | BURST | CMD  | IGN  | IBF  | OBF  |

- Call Wait OBF=0
- Call Wait IBF=0
- Out 66h,81h       ;Issue Write Cmd
- Call Wait IBF=0   ;wait for IBF=0
- Out 62h,68h       ;Issue(68h)Index
- Call Wait IBF=0   ;wait for IBF=0
- Out 62h,55h       ;Issue data(55h)

↑ embedded controller sets the busy flag as "1"

↓ remove the busy flag

FIG. 6

METHOD OF COMMUNICATING WITH EMBEDDED CONTROLLER

BACKGROUND OF THE INVENTION

1. Field of the Invention

The present invention relates to a method of communicating with an embedded controller, and more particularly to a method of communicating with an embedded controller under an advanced configuration and power interface specification (ACPI).

2. Description of the Related Art

The so-called ACPI stands for "Advanced Configuration and Power Interface Specification," which was jointly set up by several companies, including HP, Intel, Microsoft, and Toshiba. Its purpose is to effectively control power via the operating system to save more power. Wherein, the specification defines what an embedded controller is. FIG. 1 is a schematic drawing showing an structure of an IBM personal computer's hardware. FIG. 1 comprises a central processing unit (CPU) 100, a north bridge chip 102, a south bridge chip 104, an LPC bus 106, and an embedded controller 108. In FIG. 1, the embedded controller 108 is disposed on the LPC bus 106 to control the power of the battery, temperature, and rotational speed of the fan.

The ACPI also defines a communication method between the operating system and the embedded controller. The ACPI also define a status register of an embedded controller. FIG. 2 is a drawing showing a status register of an embedded controller defined by a conventional ACPI. Referring to FIG. 2, the status register has 8 bits in total. The seventh bit Bit7 and the second bit Bit2 are IGN (ignore). The sixth bit Bit6 represents a system management interrupt event, SMI_EVT. When important events of the system management are to be transmitted, Bit6 is set as logic 1. The fifth bit Bit5 represents the system control interrupt event SCI_EVT. When important events of the system control are to be transmitted, Bit5 is set as logic 1. The fourth bit Bit4 represents BURST. The third bit Bit3 represents CMD. The first bit Bit1 represents input buffer full (IBF). When the operating system transmits commands or data to the embedded controller, but the embedded controller has yet accessed them, Bit1 is set as logic 1. The zeroth bit Bit0 represents output buffer full (OBF). When the embedded controller is going to transmit data to the operating system power management handler (OSPM), Bit0 is set as logic 1.

In an operating system which supports the ACPI, such as Microsoft Windows XP, if the platform is equipped with the embedded controller, and connects with a battery or a temperature sensor, the OSPM would periodically read related data concerning the remaining power of the battery or the temperature at that time. Practically, the OSPM communicates with the embedded controller through I/O interface ports 62h/66h. A schematic drawing of the structure is shown in FIG. 3. The flowchart of the above-mentioned is shown in FIG. 4. First, it is checked if OBF is logic 0 first. If not, it means that a previous output data is left on the I/O interface of the embedded controller. This output data is then read and removed. The said procedure is repeated until OBF is logic 0 (step 401). After that, it is checked if IBF is logic 0. If not, a previous input data on the I/O interface of the embedded controller needs to be read and removed by the embedded controller until IBF is logic 0 (step 403). When both steps 401 and 403 are done, the OSPM can then transmit commands to read data from or write data in the embedded controller if needed (step 405).

After commands are transmitted (step 407), IBF becomes logic 1. Step 407 should be continued until IBF becomes logic 0 (step 409). When IBF is confirmed as logic 0 and the index value to read the data is transmitted (step 411), wait until OBF becomes logic 1 (step 413). Next, read the data via I/O port (step 415). After the write command is transmitted (step 417), IBF becomes logic 1. Therefore, it is needed to wait until IBF becomes logic 0 (step 419). When IBF is confirmed as logic 0 and the index value to write data is transmitted (step 421), IBF becomes logic 1. After IBF turns to logic 0 (step 423), the data to be written are transmitted (step 425).

The ACPI provides a secure and safe method to allow the OSPM and the embedded controller to communicate and exchange information without errors. However, it does not provide a secure accessible mechanism that can be jointly used by other application programs or apparatus driving programs liked a device driver. This also means that the method is safe only when the OSPM can access the embedded controller. When IBF is logic 0, and an application program, such as a temperature monitoring and control software of the mother board, simultaneously access the embedded controller with the OSPM, a collision or interruption may occur or the system may even go down.

SUMMARY OF THE INVENTION

Accordingly, the purpose of the present invention is to provide a communication method with an embedded controller adapted for the advanced configuration and power interface specification (ACPI), to avoid the interruption of the application program or the apparatus driving program when an operating system power management handler (OSPM) accesses an embedded controller so as to further prevent the system from going down.

Another purpose of the present invention is to provide a communication method with an embedded controller for the advanced configuration and power interface specification (ACPI) to avoid the interruption of the OSPM while the application program or the apparatus driving program accesses the embedded controller so as to further prevent collision which causes the system to go down.

The present invention provides a communication method with an embedded controller adapted for the advanced configuration and power interface specification (ACPI). This method comprises setting a busy flag in a status register of an embedded controller. When the operating system power management handler (OSPM) accesses the embedded controller, the busy flag is set as busy status. Yet, when the OSPM finishes accessing the embedded controller, the busy flag is set as not busy status.

According to an embodiment of the communication method with the embedded controller, the above-mentioned busy flag is the second bit or the seventh bit of the status register inside the embedded controller.

The present invention provides a communication method with an embedded controller for the advanced configuration and power interface specification (ACPI). The method is characterized in that an interrupt request level (IRQL) of an application program or an apparatus driving program is raised higher than that in an operating system power management handler (OSPM) when the application program or the apparatus driving program is going to access the embedded controller.

Due to the method to set a busy flag in the status register of the embedded controller, the OSPM is not affected by the interruption of the application program or the apparatus driving program, which may lead to collision and further cause the system to go down, when accessing the embedded controller. In addition, when the application program or the apparatus driving program accesses the embedded controller, the interrupt request level (IRQL) is raised higher than that in the OSPM. As a result, the interruption of the OSPM is prevented, and a collision which may crash the system is avoided.

The above-mentioned and other purposes, features, and strengths of the present invention will be better understood from the following detailed description of the preferred embodiments of the invention that is provided in communication with the accompanying drawings.

BRIEF DESCRIPTION OF THE DRAWINGS

FIG. 6 is a drawing showing an OSPM performing virtual codes to an embedded controller according to an embodiment of the present invention.

DESCRIPTION OF SOME EMBODIMENTS

Figures 1, 2:
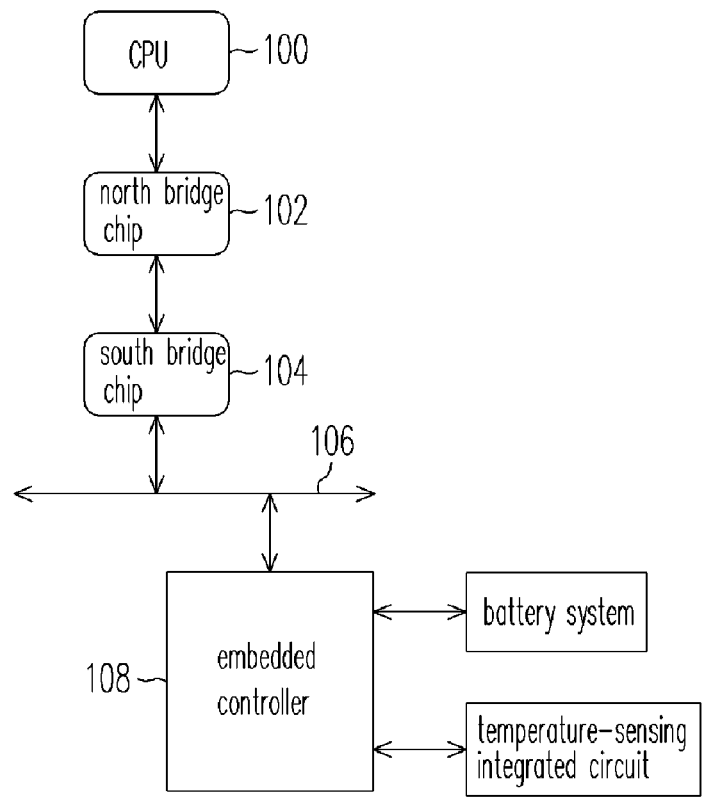
FIG. 1 is a schematic drawing showing an internal structure of a basic hardware of an IBM personal computer.
FIG. 2 is a drawing showing a status register of an embedded controller defined by a conventional ACPI.
Figure 3:
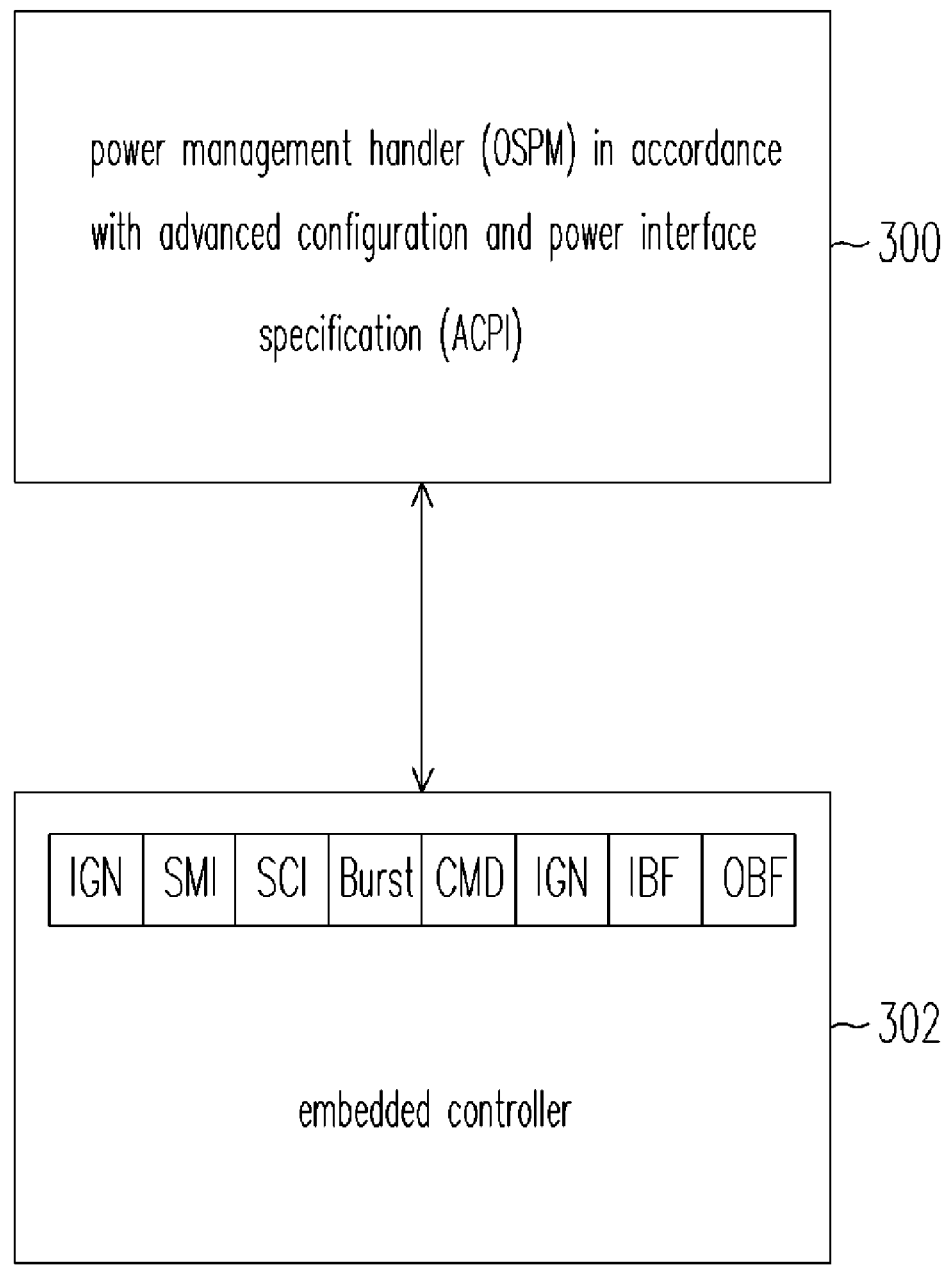
FIG. 3 is a schematic drawing showing a conventional connection structure connection of an OSPM and an embedded controller.
Figure 4:
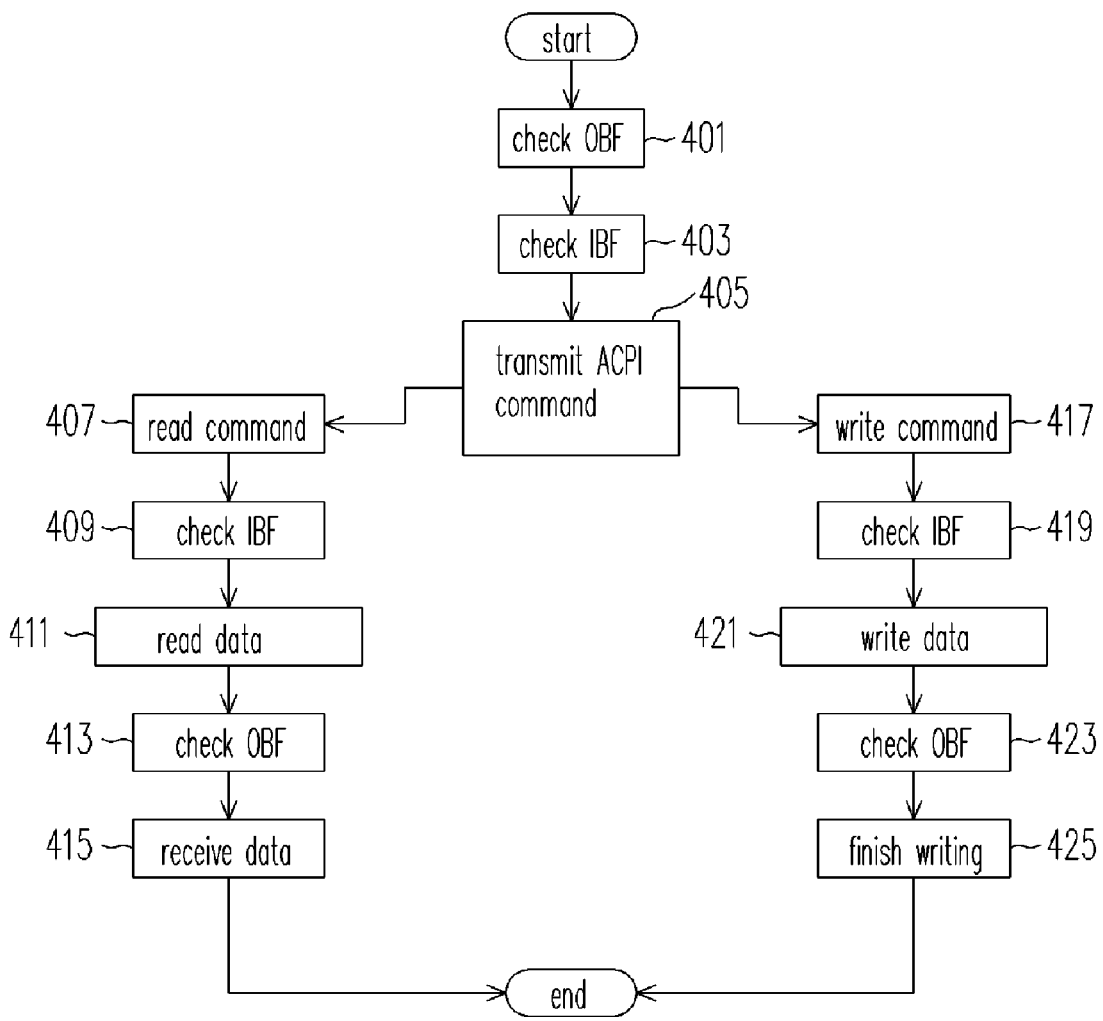
FIG. 4 is a flowchart showing a conventional OSPM controlling an embedded controller.
Figure 5:
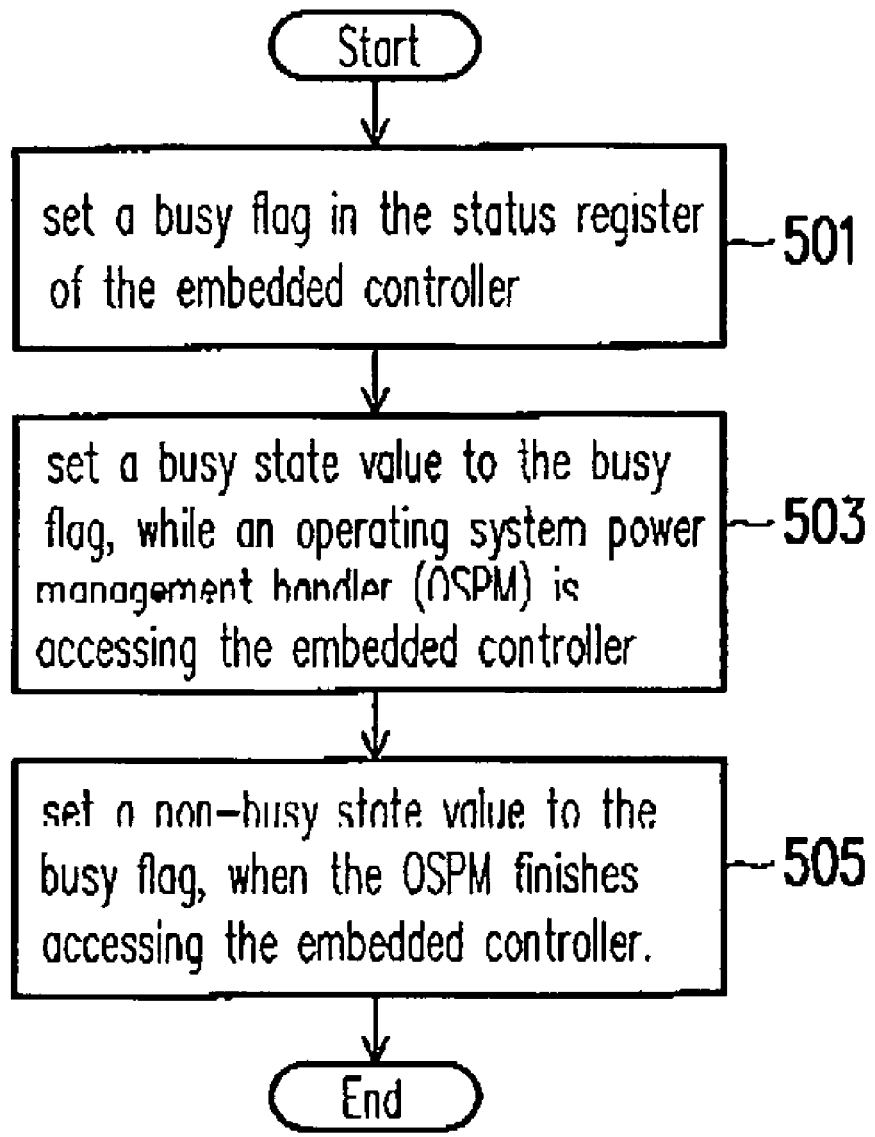
FIG. 5 is a flowchart showing a method of communicating with an embedded controller according to an embodiment of the present invention.

FIG. 5 is a flowchart showing a method of communicating with an embedded controller according to an embodiment of the present invention. The method is adapted for an advanced configuration and power interface specification (ACPI). FIG. 2 is a drawing showing a status register of an embedded controller under ACPI. Referring to FIGS. 2 and 5, the second bit Bit2 of the status register is set as a busy flag (step 501). One of ordinary skill in the art knows that the seventh bit Bit7 may also be set as the busy flag. When the operating system power management handler (OSPM) accesses the embedded controller, the busy flag can be set as logic 1. One of ordinary skill in the art understands that it can also be set as logic 0. When the application program or the apparatus driving program, such as the system monitor program of a mother board, is going to access the embedded controller, but the busy flag shows that the status is busy, the application program or the apparatus driving program cannot be allowed to access the embedded controller (step 503) even when the IBF or OBF is logic 0. However, when the OSPM finishes accessing the embedded controller and the busy flag is set as logic 0, the application program or the apparatus driving program can be allowed to access the embedded controller (step 505).

The embedded controller is used to perform the actual operations. According to the ACPI, there are five commands, 80$h$-84$h$. The form and function of each command are regulated under the ACPI. Accordingly, when the embedded controller receives any of the commands, the flag should be set as busy and the busy flag should not be removed until the command is completely finished. As a result, before other application programs or apparatus driving programs are going to input a read or write command in the embedded controller, the busy flag should be checked first so as to avoid interrupting the OSPM command. The operation of the embedded controller is shown in FIG. 6.

FIG. 6 is a drawing showing an OSPM performing virtual codes to an embedded controller. First, the OSPM checks if the OBF flag is logic 0. If it is checked as logic 0, the next step is to check if the IBF flag is logic 0. If both are checked as logic 0, the OSPM starts to send a write command 81$h$ to the embedded controller port 66. Meanwhile, the embedded controller sets a busy flag and sets the IBF flag as logic 1 upon receiving command 81$h$. Then, the OSPM waits until the IBF flag turns logic 0. When the IBF flag is logic 0 and busy flags are not set, the application program may send commands to the embedded controller while the OSPM is also sending commands to the embedded controller. This can cause the computer to crash. If a busy flag existed, the application program or the apparatus driving program will not send commands to the embedded controller so that the OSPM can continue to complete subsequent steps until the busy flag is removed.

While the application program or the apparatus driving program is accessing the embedded controller, it is possible that the OSPM handler may detect the IBF or the OBF as logic 0, and immediately access the embedded controller, causing collision or interruption to the operation of the application program or the apparatus driving program. When running in the operating system, the application program or the apparatus driving program may use a software to call the inner function of the operating system so as to raise the interrupt request level (IRQL) of the application program or the apparatus program higher than that in the OSPM and temporarily monopolize the resources. Therefore, the OSPM does not send out a command when it finds out that the IBF and the OBF is logic 0, which may lead to a collision, and an interruption while the application program or the apparatus driving program is operating the embedded controller.

In conclusion, since the second bit Bit2 or the seventh bit Bit7 of the OSPM is defined as IGN (ignore) for the OSPM according to the definition method of the present invention, its value can be ignored without affecting the access operation. For the application program or the apparatus driving program, it provides an instruction for showing the busy state. When the busy flag is logic 1, an ACPI command is being processed. Therefore, the present invention guarantees that the ACPI command will not be interrupted by other application programs.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A method of communicating with an embedded controller, adapted for an advanced configuration and power interface specification (ACPI), the method comprising:

reprogramming an ignore bit of a status register of an embedded controller;

setting a busy state value to the ignore bit, while an operating system power management handler (OSPM) accesses the embedded controller; and setting a non-busy state value to the ignore bit, when the OSPM finishes accessing the embedded controller.

2. The method of communicating with an embedded controller of claim 1, wherein the ignore bit is a second bit of the status register of the embedded controller.

3. The method of communicating with an embedded controller of claim 1, wherein the ignore bit is a seventh bit of the status register of the embedded controller.

4. The method of communicating with an embedded controller of claim 1, wherein an interrupt request level (IRQL) of an application program or an apparatus driving program is raised higher than that in the OSPM, when the application program or the apparatus driving program accesses the embedded controller.

5. The method of communicating with an embedded controller of claim 1, wherein the status register is an embedded controller status register of the ACPI.

6. The method of communicating with an embedded controller of claim 5, wherein the ignore bit is a second bit of the embedded controller status register of the ACPI.

7. The method of communicating with an embedded controller of claim 5, wherein the ignore bit is a seventh bit of the embedded controller status register of the ACPI.

* * * * *